United States Patent
Bell et al.

(10) Patent No.: US 12,393,492 B2
(45) Date of Patent: Aug. 19, 2025

(54) FORTIFIED BACKUP OF ANOMALY DETECTION

(71) Applicant: Cohesity, Inc., San Jose, CA (US)

(72) Inventors: Jonathan Bell, Wake Forest, NC (US); Jonathon Mayor, Austin, TX (US); Nagapramod Mandagere, Los Altos, CA (US)

(73) Assignee: Cohesity, Inc., Santa Clara, CA (US)

( * ) Notice: Subject to any disclaimer, the term of this patent is extended or adjusted under 35 U.S.C. 154(b) by 0 days.

(21) Appl. No.: 17/900,661

(22) Filed: Aug. 31, 2022

(65) Prior Publication Data
US 2024/0070034 A1    Feb. 29, 2024

(51) Int. Cl.
| G06F 11/00 | (2006.01) |
| G06F 11/14 | (2006.01) |
| G06F 11/32 | (2006.01) |
| G06N 20/00 | (2019.01) |

(52) U.S. Cl.
CPC ...... *G06F 11/1464* (2013.01); *G06F 11/1451* (2013.01); *G06F 11/328* (2013.01); *G06N 20/00* (2019.01)

(58) Field of Classification Search
CPC .................. G06F 11/1464; G06F 11/1451
See application file for complete search history.

(56) References Cited

U.S. PATENT DOCUMENTS

| 8,447,923 B2 * | 5/2013 | Suryanarayanan .......................... G06F 11/1458 711/111 |
| 9,306,969 B2 | 4/2016 | Dagon et al. |
| 9,785,365 B1 * | 10/2017 | Shallal ................ G06F 12/0868 |
| 10,254,996 B1 * | 4/2019 | Jain ...................... G06F 11/1451 |
| 10,289,845 B2 | 5/2019 | Charters et al. |
| 11,349,855 B1 * | 5/2022 | Amit ........................ G06F 9/547 |
| 2020/0159624 A1 * | 5/2020 | Malkov .................. G06N 20/00 |
| 2021/0044603 A1 * | 2/2021 | Annen .................. G06N 20/00 |
| 2021/0044604 A1 * | 2/2021 | Annen .................. G06F 21/565 |
| 2021/0232685 A1 * | 7/2021 | Kraemer ................ G06F 21/554 |
| 2022/0083657 A1 * | 3/2022 | Karr ......................... G06F 21/64 |
| 2022/0245245 A1 * | 8/2022 | Annen .................. G06F 16/128 |
| 2022/0292196 A1 * | 9/2022 | Bhagi ................... G06F 21/561 |
| 2022/0374519 A1 * | 11/2022 | Botelho ............... G06F 9/45558 |
| 2023/0289265 A1 * | 9/2023 | Trachy ................ G06F 11/1464 714/6.3 |

OTHER PUBLICATIONS

KR19990004788A How to check the backup data written to memory, 1997, South Korea (Year: 1997).*
CYNET, "4 Malware Detection Techniques and Their Use in EPP and EDR", Jul. 9, 2022, 8 pp., URL: https://www.cynet.com/malware/4-malware-detection-techniques-and-their-use-in-epp-and-edr/.
(Continued)

*Primary Examiner* — Amine Riad
(74) *Attorney, Agent, or Firm* — Shumaker & Sieffert, P.A.

(57) ABSTRACT

An indication to perform a backup of data stored in a persistent storage associated with a source system is received. In response to the indication to perform the backup, current execution information at least in part maintained in a volatile memory is captured. The captured current execution information is caused to be stored with backup data from the backup of the data stored in the persistent storage.

20 Claims, 6 Drawing Sheets

(56) References Cited

OTHER PUBLICATIONS

Extended Search Report from counterpart European Application No. 23194288.9 dated Nov. 6, 2023, 10 pp.
Response to Extended Search Report dated Nov. 6, 2023, from counterpart European Application No. 23194288.9 filed Sep. 5, 2024, 16 pp.
Communication pursuant to Article 94(3) EPC from counterpart European Application No. 23194288.9 dated Dec. 2, 2024, 7 pp.
Notice of Intent to Grant and Text Intended to Grant from counterpart European Application No. 23194288.9 dated Apr. 16, 2025, 49 pp.

\* cited by examiner

FORTIFIED BACKUP OF ANOMALY DETECTION

BACKGROUND OF THE INVENTION

Malicious software may be included in a file or code stored on a source system. Data associated with the source system (e.g., source system metadata, source system content data) may be backed up to a storage system. As a result, a backup of the source system includes the malicious software. The storage system may receive a request to restore to a destination system the backup of the source system. However, the destination system becomes infected with the malicious software after the backup has been restored to the destination system.

BRIEF DESCRIPTION OF THE DRAWINGS

Various embodiments of the invention are disclosed in the following detailed description and the accompanying drawings.

DETAILED DESCRIPTION

Figure 1:
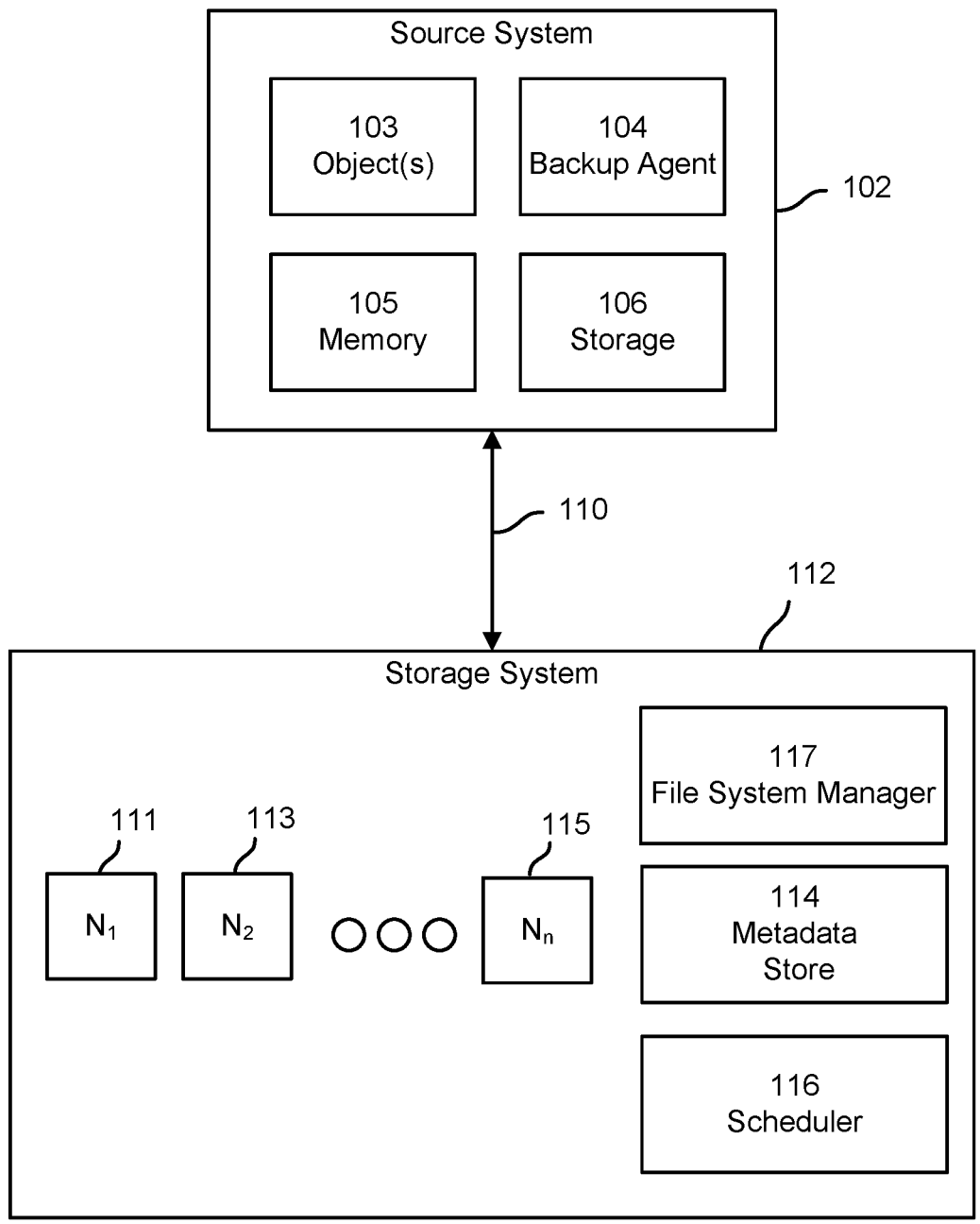
FIG. 1 is a block diagram illustrating an embodiment of a system for detecting malicious software.

A source system may be running one or more processes at any point in time. The one or more processes running on the source system may change over time. A process table is configured to provide a real-time view of the one or more processes running on the source system at different points in time.

A process may execute according to a schedule. Malicious software may be attached to the process, such that each time the process is executed, the malicious software awakens. The malicious software may attempt to connect to a network controller, initiate a remote desktop protocol (RDP) connection to another host, spawn one or more child processes, and/or perform one or more other actions. Afterwards, the malicious software returns to a dormant state. The malicious software continues to exploit the host system until it is detected and removed.

Anti-virus software may detect malicious software by comparing code included in a file or code being transferred over a network to code known to be associated with malicious software. The anti-virus software may be unable to detect the malicious software unless the anti-virus software has been specifically programmed to scan for the code known to be associated with malicious software. Thus, the malicious software is unable to be removed from a source system until it has been detected.

A backup of a source system may be performed. However, the backup of the source system may include the malicious software unless the malicious software has been detected. The disclosed techniques may enable the malicious software to be detected and prevent the malicious software from being included in the backup of the source system. Although the techniques are described with respect to backup, the techniques disclosed herein may be applicable whenever a data management operation (e.g., backup, migration, replication, archive, etc.) is performed for a cohort of data that is provided from a first system to a second system.

In a first technique, the source system includes a backup agent that causes a backup of the source system to be performed. The backup agent may receive an indication to perform a backup of data stored in a persistent storage associated with the source system. In some embodiments, the indication is received from a storage system. In some embodiments, the indication is received from a user associated with the source system. In some embodiments, the backup of data stored in the persistent storage is a full backup. In some embodiments, the backup of data stored in the persistent storage is an incremental backup.

The backup agent captures current execution information associated with the source system that is at least maintained in a volatile memory of the source system. The current execution information associated with the source system may include information in the volatile memory, process tables, one or more connections and their corresponding status (active/disabled), one or more current running processes, a list of one or more scheduled processes, a log of one or more recently executed processes, network status information (e.g., open ports), etc. The current execution information associated with the source system is captured at one or more points in time associated with the backup.

In some embodiments, current execution information associated with the source system is captured in response to receiving the indication to perform the backup of data stored in the persistent storage associated with the source system. In some embodiments, current execution information associated with the source system is captured after initiation of a backup of the data stored in the persistent storage associated with the source system. In some embodiments, current execution information associated with the source system is captured at one or more additional points in time during the backup of the data stored in the persistent storage associated with the source system. In some embodiments, current execution information associated with the source system is captured after completion of the backup of the data stored in the persistent storage associated with the source system. In some embodiments, the current execution information associated with the source system captured over a plurality of different points in time enables the backup agent to determine that an indication of an exploitation associated with the source system detected at a later point in time is related to behavior detected at an earlier point in time. In some embodiments, the current execution information associated with source system captured over a plurality of different points in time enables the backup agent to determine that an indication of an exploitation associated with the source system detected at an earlier point in time is related to behavior detected at a later point in time. The backup agent is configured to cancel one or more scheduled child processes associated with an exploitive parent process before the one or more scheduled child processes are initiated.

The backup agent analyzes the captured current execution information to determine whether there are one or more indications of an exploitation associated with the source system. The backup agent may analyze the captured current execution information by comparing the captured current exploitation information to historical execution information to detect one or more anomalies associated with the captured current execution information. The historical execution information may be associated with a previous full backup and/or one or more previous incremental backups.

A ratio between two values associated with the backup diverging from a historical ratio more than a threshold amount may indicate the source system is being exploited by malicious software. For example, the ratio between a data change rate associated with an incremental backup to the number of processes running during the backup may have increased more than a threshold amount from a historical ratio. A relationship between two values associated with the backup diverging from a historical relationship may indicate that the source system is being exploited by malicious software. For example, a data change rate associated with a backup may be more than a historical change rate by a threshold amount and a port that is normally closed is open during the backup. A process spawning more child processes than historical spawned child processes may indicate that the source system is being exploited by malicious software. For example, a process may normally spawn 10 child processes, but the process table indicates that the process spawned 100 child processes.

The backup agent may obtain external threat information from a third party system (e.g., VirusTotal, etc.). In some embodiments, the backup agent analyzes the current captured execution information in light of the external threat information.

Capturing the current execution information associated with the source system at one or more points in time associated with a backup allows the backup agent to determine whether there are one or more indications of an exploitation associated with the source system. In some embodiments, the backup agent determines that there are one or more indications of an exploitation associated with the source system based on current execution information associated with the source system captured at a single point in time. In some embodiments, the backup agent determines that there are one or more indications of an exploitation associated with the source system based on current execution information associated with the source system captured over a plurality of different points in time. In some embodiments, the current execution information associated with the source system captured over the plurality of different points in time enables the backup agent to determine that an indication of an exploitation associated with the source system detected at a later point in time is related to behavior detected at an earlier point in time.

The backup agent may determine whether there are one or more indications of an exploitation associated with the source system using a model, such as a machine learning model, a rules-based model, a heuristic model, etc. The backup agent may update the model over time based on the execution information associated with the source system. For example, the current execution information associated with the source system may be included in the historical execution information associated with the source system. A moving average of a feature included in the model may be updated after each backup.

In some embodiments, the backup agent determines that there are one or more indications of an exploitation associated with the source system. The backup agent may provide a notification indicating the source system is potentially infected with malicious software. In some embodiments, the notification (e.g., an alarm) is provided to an external system. The backup agent may alter a backup workflow. Altering the backup workflow may include tagging the backup as being suspicious, storing the backup in a sandbox environment, providing the backup to a remediation system, pausing or stopping a backup flow associated with performing the backup of the data stored in storage, etc.

In some embodiments, the backup agent determines that there are no indications of an exploitation associated with the source system. The storage system ingests and stores the data stored in the persistent storage along with the captured current execution information.

In a second technique, a storage system sends the source system a command to perform a backup. The backup may be a full backup or an incremental backup. The storage system obtains the current execution information associated with the source system via an application program interface (API) call to the source system.

In some embodiments, current execution information associated with the source system is obtained prior to sending the command to perform the backup. In some embodiments, current execution information associated with the source system is obtained after a backup of the source system is initiated. In some embodiments, current execution information associated with the source system is obtained at one or more additional points in time during the backup of the data stored in the persistent storage associated with the source system. In some embodiments, current execution information associated with the source system is obtained after completion of the backup of the data stored in the persistent storage associated with the source system. In some embodiments, the current execution information associated with the source system obtained over a plurality of different points in time enables the storage system to determine that an indication of an exploitation associated with the source system detected at a later point in time is related to behavior detected at an earlier point in time. In some embodiments, the current execution information associated with source system captured over a plurality of different points in time enables the storage system to determine that an indication of an exploitation associated with the source system detected at an earlier point in time is related to behavior detected at a later point in time. The storage system may cancel one or more scheduled child processes associated with an exploitive parent process, via an API call, before the one or more scheduled child processes are initiated.

The storage system analyzes the obtained current execution information to determine whether there are one or more indications of an exploitation associated with the source system. The storage system may analyze the obtained current execution information by comparing the obtained current exploitation information to historical execution information to detect one or more anomalies associated with the obtained current execution information.

The storage system may obtain external threat information from a third party system (e.g., VirusTotal, etc.). In some embodiments, the storage system analyzes the current captured execution information in light of the external threat information. Obtaining the current execution information associated with the source system at one or more points in time associated with a backup allows the storage system to determine whether there are one or more indications of an exploitation associated with the source system. In some embodiments, the storage system determines that there are one or more indications of an exploitation associated with the source system based on current execution information associated with the source system captured at a single point in time. In some embodiments, the storage system determines that there are one or more indications of an exploitation associated with the source system based on current execution information associated with the source system captured over a plurality of different points in time. In some embodiments, the current execution information associated with the source system captured over the plurality of different points in time enables the storage system to determine that an indication of an exploitation associated with the source system detected at a later point in time is related to behavior detected at an earlier point in time.

The storage system may determine whether there are one or more indications of an exploitation associated with the source system using a model, such as a machine learning model, a rules-based model, a heuristic model, etc. The storage system may update the model over time based on the execution information associated with the source system.

In some embodiments, the storage system determines that there are one or more indications of an exploitation associated with the source system. The storage system may provide to the source system or a third party system a notification indicating the source system is potentially infected with malicious software. In some embodiments, the storage system sends to the source system a command to alter a workflow associated with the backup.

In some embodiments, the storage system determines that there are no indications of an exploitation associated with the source system. The storage system ingests and stores the data stored in the persistent storage along with the captured current execution information.

FIG. 1 is a block diagram illustrating an embodiment of a system for detecting malicious software. In the example shown, system 100 includes source system 102 coupled to storage system 112 via connection 110. Connection 110 may be a wired or wireless connection. Connection 110 may be a LAN, WAN, intranet, the Internet, and/or a combination thereof.

Source system 102 is a computing system that stores file system data. The file system data may include a plurality of files (e.g., content files, text files, etc.) and metadata associated with the plurality of files. Source system 102 may be comprised of one or more servers, one or more computing devices, one or more storage devices, and/or a combination thereof.

Source system 102 may be configured to run one or more objects 103. Examples of objects include, but are not limited to, a virtual machine, a database, an application, a container, a pod, etc. Source system 102 include storage 106 that is configured to store file system data associated with source system 102. The file system data associated with source system 102 includes the data associated with the one or more objects 103.

Backup agent 104 may be configured to cause source system 102 to perform a backup (e.g., a full backup or incremental backup). A full backup may include all of the file system data of source system 102 at a particular moment in time. In some embodiments, a full backup for a particular object of the one or more objects 103 is performed and the full backup of the particular object includes all of the object data associated with the particular object at a particular moment in time. An incremental backup may include all of the file system data of source system 102 that has not been backed up since a previous backup. In some embodiments, an incremental backup for a particular object of the one or more objects 103 is performed and the incremental backup of the particular object includes all of the object data associated with the particular object that has not been backed up since a previous backup.

In some embodiments, backup agent 104 is running on source system 102. In some embodiments, backup agent 104 is running in one of the one or more objects 103. In some embodiments, a backup agent 104 is running on source system 102 and a separate backup agent 104 is running in one of the one or more object 103. In some embodiments, an object includes a backup function and is configured to perform a backup on its own without backup agent 104. In some embodiments, source system 102 includes a backup function and is configured to perform a backup on its own without backup agent 104. In some embodiments, storage system 112 may provide instructions to source system 102, causing source system 102 to execute backup functions without backup agent 104.

Backup agent 104 may cause a backup of source system 102 to be performed. Backup agent 104 may receive an indication to perform a backup of data stored in storage 106. In some embodiments, the indication is received from storage system 112 via scheduler 116. In some embodiments, the indication is received from a user associated with source system 102. In some embodiments, the backup of data stored in storage 106 is a full backup. In some embodiments, the backup of data stored in storage 106 is an incremental backup.

Backup agent 104 is configured to capture current execution information associated with source system 102 that is at least maintained in memory 105. The current execution information associated with source system 102 may include information in memory 105, process tables, one or more connections and their corresponding status (active/disabled), one or more current running processes, a list of one or more scheduled processes, a log of one or more recently executed processes, network status information (e.g., open ports, closed ports), etc. The current execution information associated with source system 102 is captured at one or more points in time associated with a backup. In some embodiments, current execution information associated with source system 102 is captured in response to receiving the indication to perform the backup of data stored in storage 106. In some embodiments, current execution information associated with source system 102 is captured after an initiation of a backup of the data stored in storage 106. In some embodiments, current execution information associated with source system 102 is captured at one or more additional points in time during the backup of the data stored in storage 106. In some embodiments, current execution information associated with source system 102 is captured after a completion of the backup of the data stored in storage 106.

Backup agent 104 is configured to analyze the captured current exploitation information to determine whether there are one or more indications of an exploitation associated with source system 102. Backup agent 104 may analyze the captured current execution information by comparing the captured current exploitation information to historical execution information to detect one or more anomalies associated with the captured current execution information. The historical execution information may be associated with a previous full backup and/or one or more previous incremental backups.

A ratio between two values associated with the backup diverging from a historical ratio more than a threshold amount may indicate source system 102 is being exploited by malicious software. For example, the ratio between a data change rate associated with an incremental backup to the number of processes running during the backup may have increased more than a threshold amount from a historical ratio. A relationship between two values associated with the backup diverging from a historical relationship may indicate that source system 102 is being exploited by malicious software. For example, a data change rate associated with a backup may be more than a historical change rate by a threshold amount and a port that is normally closed is open during the backup. A process spawning more child processes than historical spawned child processes may indicate that source system 102 is being exploited by malicious software. For example, a process may normally spawn 10 child processes, but the process table indicates that the process spawned 100 child processes. The current number of open ports may be compared to a historical number of open ports. In some embodiments, backup agent 104 determines statistics for all network connections (e.g., via netstat) to determine whether a destination or source for network traffic is associated with a nefarious actor.

Backup agent 104 may analyze the captured current execution information by comparing the captured current exploitation information to known sources for threat identification (e.g., VirusTotal, etc.) to detect one or more anomalies associated with the captured current execution information.

Capturing the current execution information associated with source system 102 at one or more points in time allows the backup agent to determine whether there are one or more indications of an exploitation associated with the source system. In some embodiments, backup agent 102 determines that there are one or more indications of an exploitation associated with source system 102 based on current execution information associated with source system 102 captured at a single point in time. In some embodiments, backup agent 104 determines that there are one or more indications of an exploitation associated with source system 102 based on current execution information associated with source system 102 captured over a plurality of different points in time. In some embodiments, the current execution information associated with source system 102 captured over the plurality of different points in time enables backup agent 104 to determine that an indication of an exploitation associated with source system 102 detected at a later point in time is related to behavior detected at an earlier point in time. In some embodiments, the current execution information associated with source system 102 captured over the plurality of different points in time enables backup agent 104 to determine that an indication of an exploitation associated with source system 102 detected at an earlier point in time is related to behavior detected at a later point in time. Backup agent 104 is configured to cancel one or more scheduled child processes associated with an exploitive parent process before they are initiated.

Backup agent 104 may determine whether there are one or more indications of an exploitation associated with source system 102 using a model, such as a machine learning model, a rules-based model, a heuristic model, etc. The machine learning model may be trained using a supervised machine learning algorithm. For example, the supervised machine learning algorithm may be a linear regression algorithm, a logistical regression algorithm, a random forest algorithm, a gradient boosted trees algorithm, a support vector machines algorithm, a neural networks algorithm, a decision tree algorithm, a Naïve Bayes algorithm, a nearest neighbor algorithm, or any other type of supervised machine learning algorithm. In some embodiments, the machine learning model is trained using a semi-supervised machine learning algorithm that utilizes one or more labeled data sets and one or more pseudo-labeled data sets. In some embodiments, the machine learning model is trained using a reinforcement machine learning algorithm. For example, the reinforcement machine learning algorithm may be a Q-Learning algorithm, a temporal difference algorithm, a Monte-Carlo tree search algorithm, an asynchronous actor-critic agent's algorithm, or any other type of reinforcement machine learning algorithm. In some embodiments, the machine learning model is trained using an unsupervised machine learning algorithm. For example, clustering methods, anomaly detection, neural network, etc.

In some embodiments, backup agent 104 determines that there are one or more indications of an exploitation associated with source system 102. Backup agent 104 is configured to provide a notification indicating source system 102 is potentially infected with malicious software. The notification may be provided to a user associated with source system 102 via a graphical user interface associated with source system 102. In some embodiments, the notification is provided to an external system (e.g., an external security system). In some embodiments, the notification is provided to storage system 112. In response to the notification, backup agent 104 is configured to alter a backup workflow. Altering the backup workflow may include tagging the backup as being suspicious, storing the backup in a sandbox environment, providing the backup to a remediation system, pausing or stopping a backup flow associated with performing the backup of the data stored in storage 106, etc. Backup agent 104 may tag a backup with context information (threat actor, common vulnerability and exposure (CVE) that enables a person to understand why the backup is tagged. In some embodiments, storage system 112 stops ingesting data associated with the backup or terminates connection 110.

In some embodiments, backup agent 104 determines that there are no indications of an exploitation associated with the source system. Backup agent 104 may tag the backup as being a clean backup. The tag may also include the date at which the backup was performed. Storage system 112 ingests and stores the data stored in storage 106 along with the captured current execution information.

In some embodiments, storage system 112 is configured to send to source system 102 a command to perform a backup. The backup may be a full backup or an incremental backup. Storage system 112 is configured to obtain the current execution information associated with source system 102 that is at least maintained in memory 105 via an API call to source system 102.

In some embodiments, current execution information associated with source system 102 is obtained prior to sending the command to perform the backup. In some embodiments, current execution information associated with source system 102 is obtained after a backup of source system 102 is initiated. In some embodiments, current execution information associated with source system 102 is obtained at one or more additional points in time during the backup of the data stored in the persistent storage associated with source system 102. In some embodiments, current execution information associated with source system 102 is obtained after completion of the backup of the data stored in the persistent storage associated with source system 102. In some embodiments, the current execution information associated with source system 102 obtained over a plurality of different points in time enables storage system 112 to determine that an indication of an exploitation associated with source system 102 detected at a later point in time is related to behavior detected at an earlier point in time. In some embodiments, the current execution information associated with source system 102 captured over a plurality of different points in time enables storage system 112 to determine that an indication of an exploitation associated with source system 102 detected at an earlier point in time is related to behavior detected at a later point in time. Storage system 112 may cancel one or more scheduled child processes associated with an exploitive parent process, via an API call, before the one or more scheduled child processes are initiated.

Storage system 112 is configured to analyze the obtained current execution information to determine whether there are one or more indications of an exploitation associated with source system 102. Storage system 112 may analyze the obtained current execution information by comparing the obtained current exploitation information to historical execution information to detect one or more anomalies associated with the obtained current execution information.

Storage system 112 may obtain external threat information from a third party system (e.g., VirusTotal, etc.). In some embodiments, storage system 112 analyzes the current captured execution information in light of the external threat information. Obtaining the current execution information associated with source system 102 at one or more points in time associated with a backup allows storage system 112 to determine whether there are one or more indications of an exploitation associated with source system 102. In some embodiments, storage system 112 determines that there are one or more indications of an exploitation associated with source system 102 based on current execution information associated with source system 102 captured at a single point in time. In some embodiments, storage system 112 determines that there are one or more indications of an exploitation associated with source system 102 based on current execution information associated with source system 102 captured over a plurality of different points in time. In some embodiments, the current execution information associated with source system 102 captured over the plurality of different points in time enables storage system 112 to determine that an indication of an exploitation associated with source system 102 detected at a later point in time is related to behavior detected at an earlier point in time.

Storage system 112 is configured to determine whether there are one or more indications of an exploitation associated with source system 102 using a model, such as a machine learning model, a rules-based model, a heuristic model, etc. The machine learning model may be trained using a supervised machine learning algorithm, a semi-supervised machine learning algorithm, or an unsupervised machine learning algorithm. Storage system 112 may update the model over time based on the execution information associated with source system 102.

In some embodiments, storage system 112 determines that there are one or more indications of an exploitation associated with source system 102. Storage system 112 may provide to source system 102 or a third party system a notification indicating that source system 102 is potentially infected with malicious software. In some embodiments, storage system 112 sends to source system 102 a command to alter a workflow associated with the backup. Altering the backup workflow may include tagging the backup as being suspicious, storing the backup in a sandbox environment, providing the backup to a remediation system, pausing or stop a backup flow associated with performing the backup of the data stored in storage 106, etc. Storage system 112 may tag with context information (threat actor, common vulnerability and exposure (CVE) that enables a person to understand why the backup is tagged.

In some embodiments, storage system 112 determines that there are no indications of an exploitation associated with source system 102. Storage system 112 ingests and stores the data stored in the persistent storage along with the captured current execution information.

Storage system 112 is comprised of a storage cluster that includes a plurality of storage nodes 111, 113, 115. Although three storage nodes are shown, storage system 112 may be comprised of n storage nodes.

In some embodiments, the storage nodes are homogenous nodes where each storage node has the same capabilities (e.g., processing, storage, memory, etc.). In some embodiments, at least one of the storage nodes is a heterogeneous node with different capabilities (e.g., processing, storage, memory, etc.) than the other storage nodes of storage system 112.

In some embodiments, a storage node of storage system 112 includes a processor, memory, and a plurality of storage devices. The plurality of storage devices may include one or more solid state drives, one or more hard disk drives, or a combination thereof.

In some embodiments, a storage node of storage system 112 includes a processor and memory, and is coupled to a separate storage device. The separate storage device may include one or more storage devices (e.g., flash storage devices). A storage device may be segmented into a plurality of partitions. Each of the storage nodes 111, 113, 115 may be allocated one or more of the partitions. The one or more partitions allocated to a storage node may be configured to store data associated with some or all of the plurality of objects that were backed up to storage system 112. For example, the separate storage device may be segmented into 10 partitions and storage system 112 may include 10 storage nodes. A storage node of the 10 storage nodes may be allocated one of the 10 partitions.

In some embodiments, a storage node of storage system 112 includes a processor, memory, and a storage device. The storage node may be coupled to a separate storage device. The separate storage device may include one or more storage devices. A storage device may be segmented into a plurality of partitions. Each of the storage nodes 111, 113, 115 may be allocated one or more of the partitions. The one or more partitions allocated to a storage node may be configured to store data associated with some or all of the plurality of objects that were backed up to storage system 112. For example, the separate storage device may be segmented into 10 partitions and storage system 112 may include 10 storage nodes. A storage node of the 10 storage nodes may be allocated one of the 10 partitions.

Storage system 112 may be a cloud instantiation of a storage system. A configuration of cloud instantiation of storage system 112 may be a virtual replica of a storage system. For example, a storage system may be comprised of three storage nodes, each storage node with a storage capacity of 10 TB. A cloud instantiation of the storage system may be comprised of three virtual nodes, each virtual node with a storage capacity of 10 TB. In other embodiments, a cloud instantiation of a storage system may have more storage capacity than an on-premises instantiation of a storage system. In other embodiments, a cloud instantiation of a storage system may have less storage capacity than an on-premises instantiation of storage system.

Storage system 112 includes a file system manager 117 that is configured to organize the file system data of the backup using a tree data structure. An example of the tree data structure is a snapshot tree, which may be based on a B+ tree structure (or other type of tree structure in other embodiments). Storage system 112 may store a plurality of tree data structures in metadata store 114, which is accessible by storage nodes 111, 113, 115. Metadata store 114 may be stored in one or more memories of the storage nodes 111, 113, 115. Storage system 112 may generate a snapshot tree and one or more metadata structures for each backup.

In the event the backup corresponds to all of the file system data of source system 102, a view corresponding to the backup may be comprised of a snapshot tree and one or more object metadata structures. The snapshot tree may be configured to store the metadata associated with source system 102. An object metadata structure may be configured to store the metadata associated with one of the one or more objects 103. Each of the one or more objects 103 may have a corresponding metadata structure.

In the event the backup corresponds to all of the object data of one of the one or more objects 103 (e.g., a backup of a virtual machine), a view corresponding to the backup may be comprised of a snapshot tree and one or more object file metadata structures. The snapshot tree may be configured to store the metadata associated with one of the one or more objects 103. An object file metadata structure may be configured to store the metadata associated with an object file included in the object.

The tree data structure may be used to capture different views of data. A view of data may correspond to a full backup, an incremental backup, a clone of data, a file, a replica of a backup, a backup of an object, a replica of an object, a tiered object, a tiered file, etc. The tree data structure allows a chain of snapshot trees to be linked together by allowing a node of a later version of a snapshot tree to reference a node of a previous version of a snapshot tree. For example, a root node or an intermediate node of a snapshot tree corresponding to a second backup may reference an intermediate node or leaf node of a snapshot tree corresponding to a first backup.

A snapshot tree is a representation of a fully hydrated restoration point because it provides a complete view of source system 102, an object 103, or data generated on or by the storage system 112 at a particular moment in time. A fully hydrated restoration point is a restoration point that is ready for use without having to reconstruct a plurality of backups to use it. Instead of reconstructing a restoration point by starting with a full backup and applying one or more data changes associated with one or more incremental backups to the data associated with the full backup, storage system 112 maintains fully hydrated restoration points. Any file associated with source system 102, an object at a particular time and the file's contents, or a file generated on or by storage system 112, for which there is an associated reference restoration point, may be determined from the snapshot tree, regardless if the associated reference restoration was a full reference restoration point or an intermediate reference restoration point.

A snapshot tree may include a root node, one or more levels of one or more intermediate nodes associated with the root node, and one or more leaf nodes associated with an intermediate node of the lowest intermediate level. The root node of a snapshot tree may include one or more pointers to one or more intermediate nodes. Each intermediate node may include one or more pointers to other nodes (e.g., a lower intermediate node or a leaf node). A leaf node may store file system metadata, data associated with a file that is less than a limit size, an identifier of a data brick, a pointer to a metadata structure (e.g., object metadata structure or an object file metadata structure), a pointer to a data chunk stored on the storage cluster, etc.

A metadata structure (e.g., object file metadata structure, object metadata structure, file metadata structure) may include a root node, one or more levels of one or more intermediate nodes associated with the root node, and one or more leaf nodes associated with an intermediate node of the lowest intermediate level. The tree data structure associated with a metadata structure allows a chain of metadata structures corresponding to different versions of an object, an object file, or a file to be linked together by allowing a node of a later version of a metadata structure to reference a node of a previous version of a metadata structure. A leaf node of a metadata structure may store information, such as an identifier of a data brick associated with one or more data chunks and information associated with the one or more data chunks.

Storage system 112 maintains metadata that are stored in metadata store 114, such as a chunk metadata data structure, a chunk file metadata data structure, and a brick data structure. The chunk metadata data structure is comprised of a plurality of entries. Each entry associates a chunk identifier corresponding to a data chunk with a chunk file identifier corresponding to a chunk file storing the data chunk. The chunk file metadata data structure is comprised of a plurality of entries. Each entry associates a chunk file identifier corresponding to a chunk file with one or more chunk identifiers corresponding to one or more data chunks. This indicates the one or more data chunks that are stored in the chunk file having the chunk file identifier. Storage system 112 may store a plurality of chunk files for one or more storage tenants. The data stored by storage system 112 may be deduplicated across the one or more storage tenants.

The tree data structure includes a plurality of nodes that are associated with corresponding data bricks. A data brick is associated with one or more data chunks. A size of a fixed-size data chunk may be the same size as a data brick, e.g., a size of a data brick is 256 kb-512 kb. The one or more data chunks associated with the data brick may each have a size of 8 kb-16 kb. The brick metadata data structure is comprised of a plurality of entries. Each entry corresponds to a data brick and associates a brick identifier corresponding to the data brick with a chunk identifier corresponding to the one or more data chunks associated with the data brick.

Storage system 112 includes scheduler 116 that determines a backup of one or more objects 103 associated with source system 102 is to be performed. The one or more objects 103 associated with source system 102 may include one or more objects that were previously backed up to storage system 112 and/or one or more new objects that were not previously backed up to the storage system. In some embodiments, a full back up of an object is determined to be performed. In some embodiments, an incremental back up of the object is determined to be performed.

Figure 2:
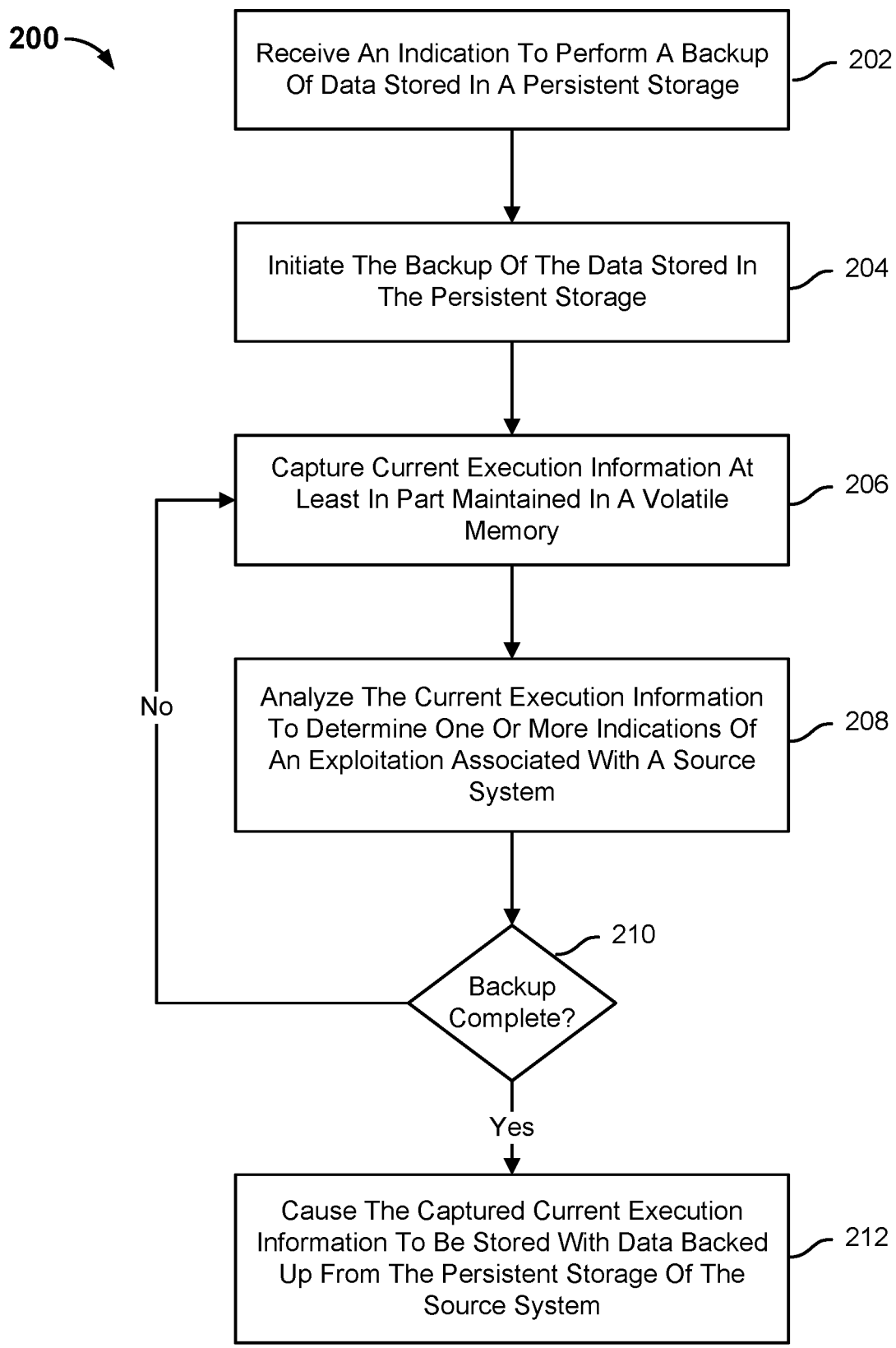
FIG. 2 is a flow diagram illustrating a process for detecting malicious software in accordance with some embodiments.

FIG. 2 is a flow diagram illustrating a process for detecting malicious software in accordance with some embodiments. In the example shown, process 200 may be implemented by a backup agent, such as backup agent 104.

At 202, an indication to perform a backup of data stored in a persistent storage is received. In some embodiments, the indication is received from a storage system. In some embodiments, the indication is received from a user associated with the source system.

At 204, the backup of the data stored in the persistent storage is initiated. In some embodiments, the backup of data stored in the persistent storage is a full backup. In some embodiments, the backup of data stored in the persistent storage is an incremental backup.

At 206, current execution information maintained at least in part in a volatile memory is captured. The backup agent captures current execution information associated with the source system that is at least maintained in a volatile memory of the source system. The current execution information associated with the source system may include information in the volatile memory, process tables, one or more connections and their corresponding status (active/disabled), one or more current running processes, a list of one or more scheduled processes, a log of one or more recently executed processes, network status information (e.g., open ports), etc.

The current execution information associated with the source system is captured at one or more points in time during the backup. In some embodiments, current execution information associated with the source system is captured in response to receiving the indication to perform the backup of data stored in the persistent storage associated with the source system. In some embodiments, current execution information associated with the source system is captured after an initiation of a backup of the data stored in the persistent storage associated with the source system. In some embodiments, current execution information associated with the source system is captured at one or more additional points in time during the backup of the data stored in the persistent storage associated with the source system. In some embodiments, current execution information associated with the source system is captured after completion of the backup of the data stored in the persistent storage associated with the source system.

In some embodiments, step 206 is performed before step 204. In some embodiments, step 206 is performed in parallel with step 204.

At 208, the current execution information is analyzed to determine one or more indications of an exploitation associated with the source system. The backup agent analyzes the captured current exploitation information to determine whether there are one or more indications of an exploitation associated with the source system. In some embodiments, external threat information is obtained from known sources for threat identification (e.g., VirusTotal, etc.). The threat identification may be used with the current execution information to determine if the source system is being exploited. For example, the external threat information may indicate that a particular port is associated with a threat and the current execution information may indicate that the particular port is open.

At 210, it is determined whether a backup of the source system is complete. In response to a determination that the backup of the source is not complete, process 200 returns to 206 where the current execution information is captured at an additional point in time. In response to a determination that the backup system of the source system is complete, process 200 proceeds to step 212. In some embodiments, step 210 is optional.

At 212, the captured current execution is caused to be stored with data backed up from the persistent storage of the source system.

Figure 3:
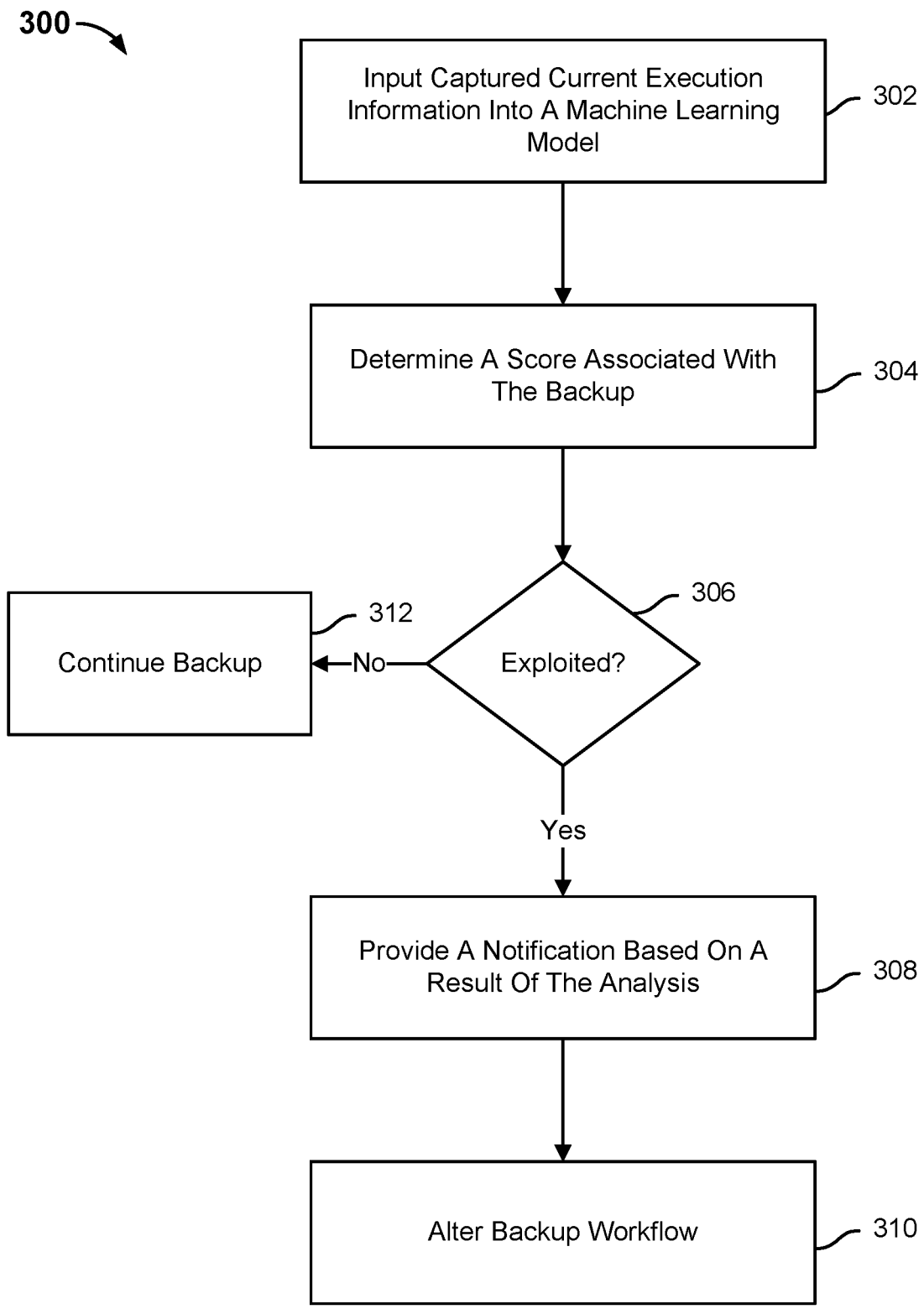
FIG. 3 is a flow diagram illustrating a process of analyzing current execution information in accordance with some embodiments.

FIG. 3 is a flow diagram illustrating a process of analyzing current execution information in accordance with some embodiments. In the example shown, process 300 may be implemented by a backup agent, such as backup agent 104. In some embodiments, process 300 is implemented to perform some or all of step 208 of process 200.

At 302, captured current execution information is inputted into a machine learning model. The machine learning model may be trained using a supervised machine learning algorithm. For example, the supervised machine learning algorithm may be a linear regression algorithm, a logistical regression algorithm, a random forest algorithm, a gradient boosted trees algorithm, a support vector machines algorithm, a neural networks algorithm, a decision tree algorithm, a Naïve Bayes algorithm, a nearest neighbor algorithm, or any other type of supervised machine learning algorithm. In some embodiments, the machine learning model is trained using a semi-supervised machine learning algorithm that utilizes one or more labeled data sets and one or more pseudo-labeled data sets. In some embodiments, the machine learning model is trained using a reinforcement machine learning algorithm. For example, the reinforcement machine learning algorithm may be a Q-Learning algorithm, a temporal difference algorithm, a Monte-Carlo tree search algorithm, an asynchronous actor-critic agent's algorithm, or any other type of reinforcement machine learning algorithm. In some embodiments, the machine learning model is trained using an unsupervised machine learning algorithm. For example, clustering methods, anomaly detection, neural network, etc.

At 304, a score associated with the backup is determined. The machine learning model outputs the score associated with the backup based on the captured current execution information.

At 306, it is determined whether the score associated with the backup indicates the source system has been exploited. The score associated with the backup is compared to an exploitation threshold score. In response to a determination that the score indicates the source system has been exploited (e.g., the score associated with the backup is greater than the exploitation threshold score), process 300 proceeds to 308. In response to a determination that the score does not indicate that the source system has been exploited (e.g., the score associated with the backup is not greater than the exploitation threshold score), process 300 proceeds to 312.

In some embodiments, the score indicates the source system has been exploited in the event the score associated with the backup is greater than the exploitation threshold score and the score indicates the source system has not been exploited in the event the score associated with the backup is not greater than the exploitation threshold score.

At 308, a notification based on a result of the analysis is provided. The notification may be provided to a user associated with the source system via a graphical user interface associated with the source system. In some embodiments, the notification is provided to an external system. In some embodiments, the notification is provided to the storage system. In response to the notification, storage system may stop ingesting data associated with the backup or terminate a connection with the source system. In some embodiments, the backup is flagged to indicate that it may have been subject to malicious software.

At 310, the backup workflow is altered based on a policy. In some embodiments, the policy indicates that the backup is flagged as being suspicious. In some embodiments, the policy indicates that a storage destination for the backup is to be modified from the storage system to a sandbox environment. In some embodiments, the policy indicates that backup is to be paused. In some embodiments, the policy indicates the backup is to be stored at a remediation system instead of the storage system.

In some embodiments, step 310 is optional.

At 312, a backup workflow is continued.

Figure 4:
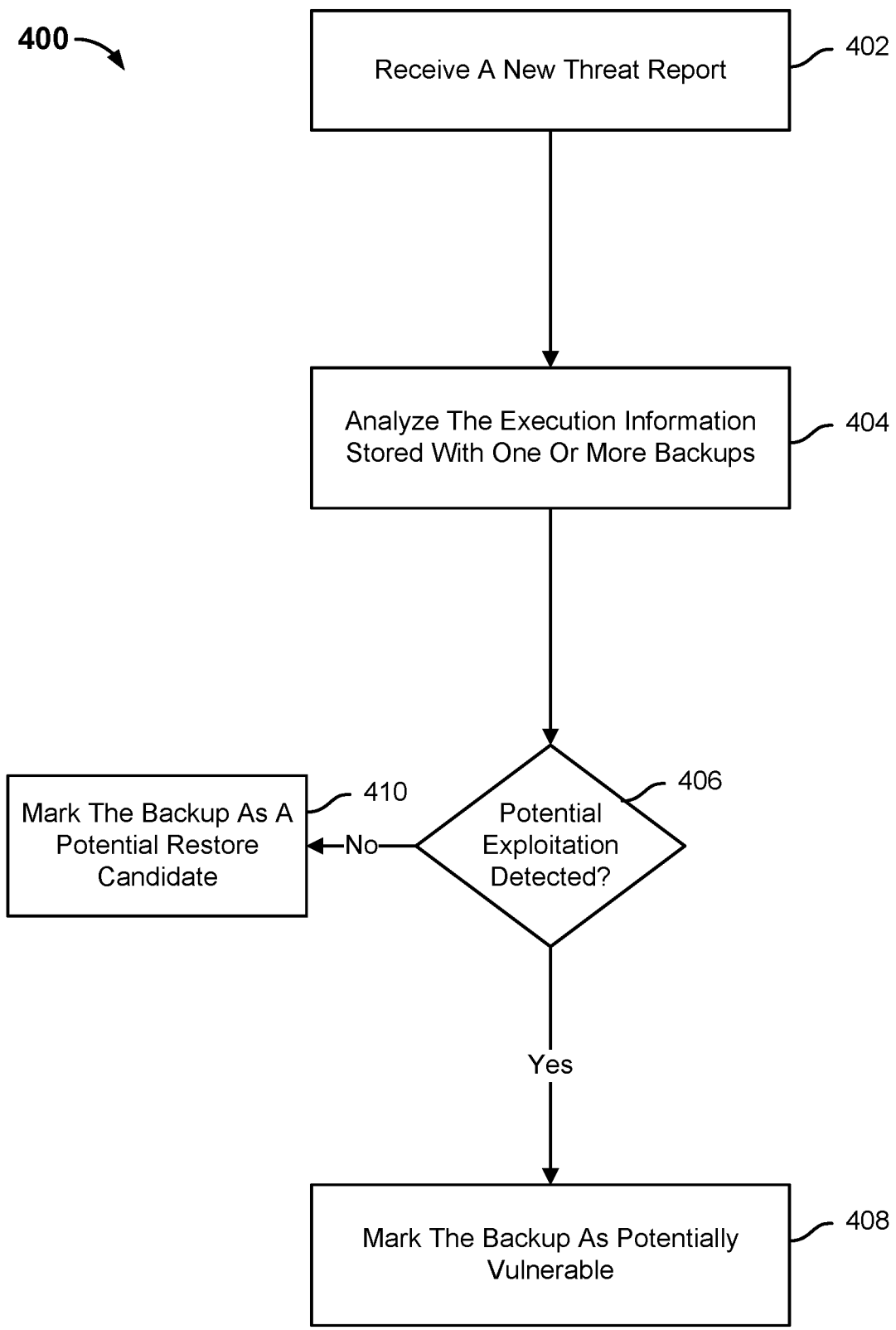
FIG. 4 is a flow diagram illustrating a process of determining potential restore candidates in accordance with some embodiments.

FIG. 4 is a flow diagram illustrating a process of determining potential restore candidates in accordance with some embodiments. In the example shown, process 400 may be implemented by a storage system, such as storage system 112. Process 400 enables a backup to be scanned for vulnerabilities without requiring a restoration or a full scan of the backup. As a result, time and computing resources of the storage system are conserved.

At 402, a new threat report is received. The new threat report may be received from a third party, such as the Internet Storm Center or VirusTotal. The new threat report may indicate one or more internet protocol (IP) addresses and/or ports associated with malicious software.

At 404, execution information stored with one or more backups is analyzed. In some embodiments, the storage system utilizes the execution information stored with the backup to determine, at a time associated with a backup of the source system, whether the source system had a connection with any of the one or more IP addresses included in the new threat report. In some embodiments, the storage system utilizes the execution information stored with the backup to determine, at a time associated with a backup of the source system, whether the source system had an open port as indicated by the new threat report.

In some embodiments, the storage system utilizes the execution information stored with a plurality of backups to determine when certain changes were made to the execution information. For example, the storage system may determine which backup of the plurality of backups indicates that a source system started to have a connection with any of the one or more IP addresses included in the new threat report. The storage system may determine which backup of the plurality of backups indicates that a port of the source system changed from a closed state to an open state.

At 406, it is determined whether a potential exploitation is detected. In some embodiments, a score associated with stored execution information for a backup is determined. In some embodiments, a score associated with stored execution information for a plurality of backups is determined. A machine learning model associated with the storage system outputs the score associated with the backup based on the execution information stored with the backup and the new threat report. The new score is stored with the backup. A potential exploitation may be detected in the event the score associated with the stored execution information is greater than an exploitation threshold score. In some embodiments, the exploitation threshold score is a static threshold score. In some embodiments, the exploitation threshold score is a dynamic threshold score.

In some embodiments, the values associated with the execution information are mapped to a feature space. For a plurality of normal backups, the values associated with the execution information may cluster near a particular area in the feature space. A potential exploitation may be detected in the event the values associated with the execution information are a threshold distance away from a centroid of the cluster.

In some embodiments, the score associated with the stored execution information is compared to a historical score of the stored execution information. A potential exploitation may be detected in the event the score associated with the stored execution information diverges from the historical score of the stored execution information by a threshold amount.

In response to a determination that a potential exploitation was detected, process 400 proceeds to 408. In response to a determination that a potential exploitation was not detected, process 400 proceeds to 410.

At 408, the backup is marked as being potentially vulnerable.

At 410, the backup is marked as being a potential restore candidate.

Figure 5:
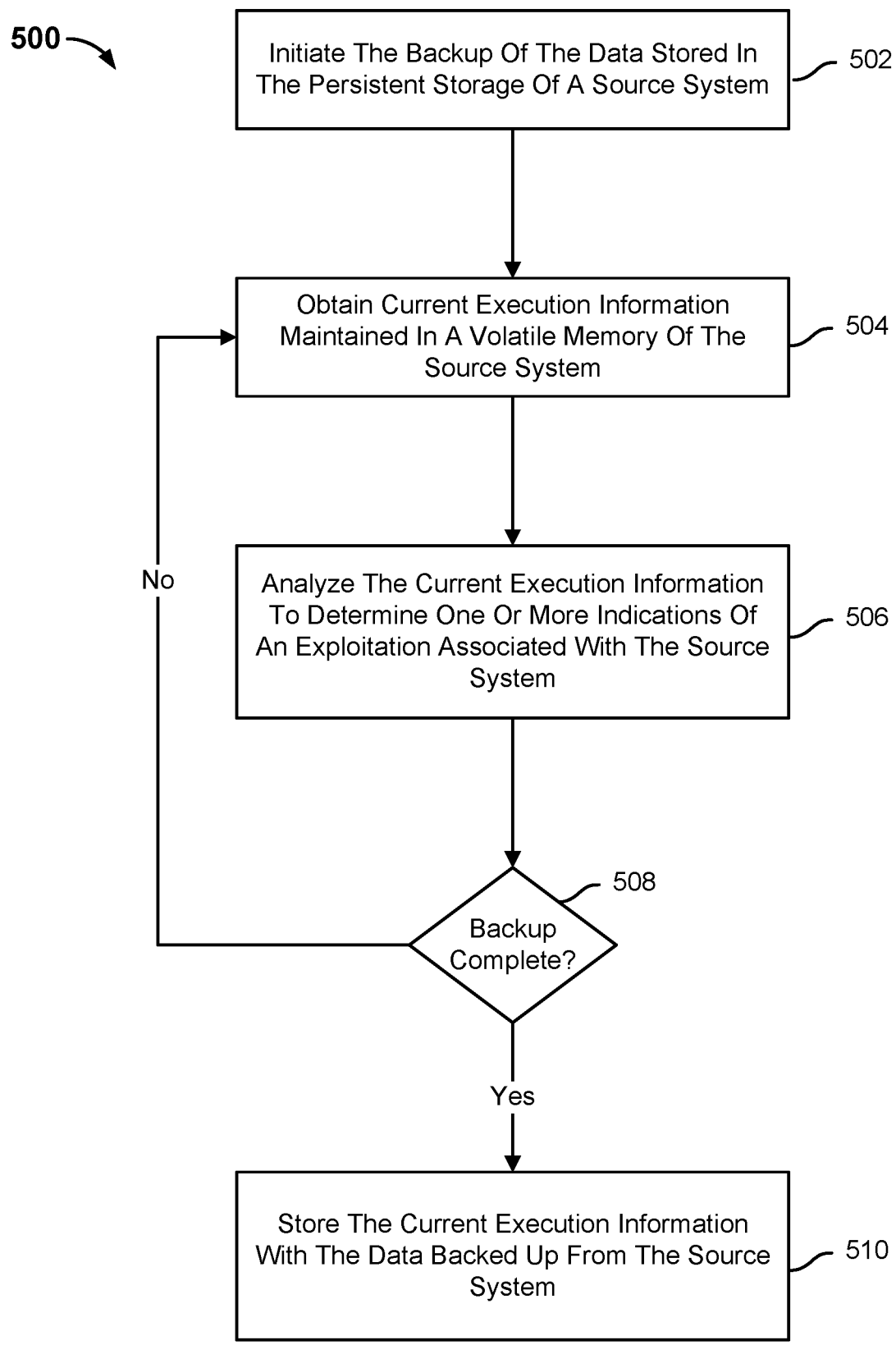
FIG. 5 is a flow diagram illustrating a process for detecting malicious software in accordance with some embodiments.

FIG. 5 is a flow diagram illustrating a process for detecting malicious software in accordance with some embodiments. In the example shown, process 500 may be implemented by a storage system, such as storage system 112.

At 502, a backup of data stored in a persistent storage of a source system is initiated. The storage system sends to the source system a command to perform a backup. The backup may be a full backup or an incremental backup.

At 504, current execution information maintained in a volatile memory of the source system is obtained. The storage system obtains the current execution information associated with the source system via an API call to the source system. The current execution information associated with the source system may include information in the volatile memory, process tables, one or more connections and their corresponding status (active/disabled), one or more current running processes, a list of one or more scheduled processes, a log of one or more recently executed processes, network status information (e.g., open ports), etc.

In some embodiments, current execution information associated with the source system is obtained prior to sending the command to perform the backup. In some embodiments, current execution information associated with the source system is obtained after a backup of the source system is initiated. In some embodiments, current execution information associated with the source system is obtained at one or more additional points in time during the backup of the data stored in the persistent storage associated with the source system. In some embodiments, current execution information associated with the source system is obtained after completion of the backup of the data stored in the persistent storage associated with the source system. In some embodiments, the current execution information associated with the source system obtained over a plurality of different points in time enables the storage system to determine that an indication of an exploitation associated with the source system detected at a later point in time is related to behavior detected at an earlier point in time. In some embodiments, the current execution information associated with source system captured over a plurality of different points in time enables the storage system to determine that an indication of an exploitation associated with the source system detected at an earlier point in time is related to behavior detected at a later point in time. The storage system may cancel one or more scheduled child processes associated with an exploitive parent process, via an API call, before the one or more scheduled child processes are initiated.

In some embodiments, step 504 is performed before step 502. In some embodiments, step 504 is performed in parallel with step 502.

At 506, the current execution information is analyzed to determine one or more indications of an exploitation associated with the source system. The storage system may analyze the obtained current execution information by comparing the obtained current exploitation information to historical execution information to detect one or more anomalies associated with the obtained current execution information.

The storage system may obtain external threat information from a third party system (e.g., VirusTotal, etc.). In some embodiments, the storage system analyzes the current captured execution information in light of the external threat information.

Obtaining the current execution information associated with the source system at one or more points in time associated with a backup allows the storage system to determine whether there are one or more indications of an exploitation associated with the source system. In some embodiments, the storage system determines that there are one or more indications of an exploitation associated with the source system based on current execution information associated with the source system captured at a single point in time. In some embodiments, the storage system determines that there are one or more indications of an exploitation associated with the source system based on current execution information associated with the source system captured over a plurality of different points in time. In some embodiments, the current execution information associated with the source system captured over the plurality of different points in time enables the storage system to determine that an indication of an exploitation associated with the source system detected at a later point in time is related to behavior detected at an earlier point in time.

At 508, it is determined whether the backup is complete. In response to a determination that the backup is complete, process 500 proceeds to 510. In response to a determination that the backup is not complete, process 500 returns to 504. In some embodiments, step 508 is optional.

At 510, the current execution information is stored with data backed up from the source system.

Figure 6:
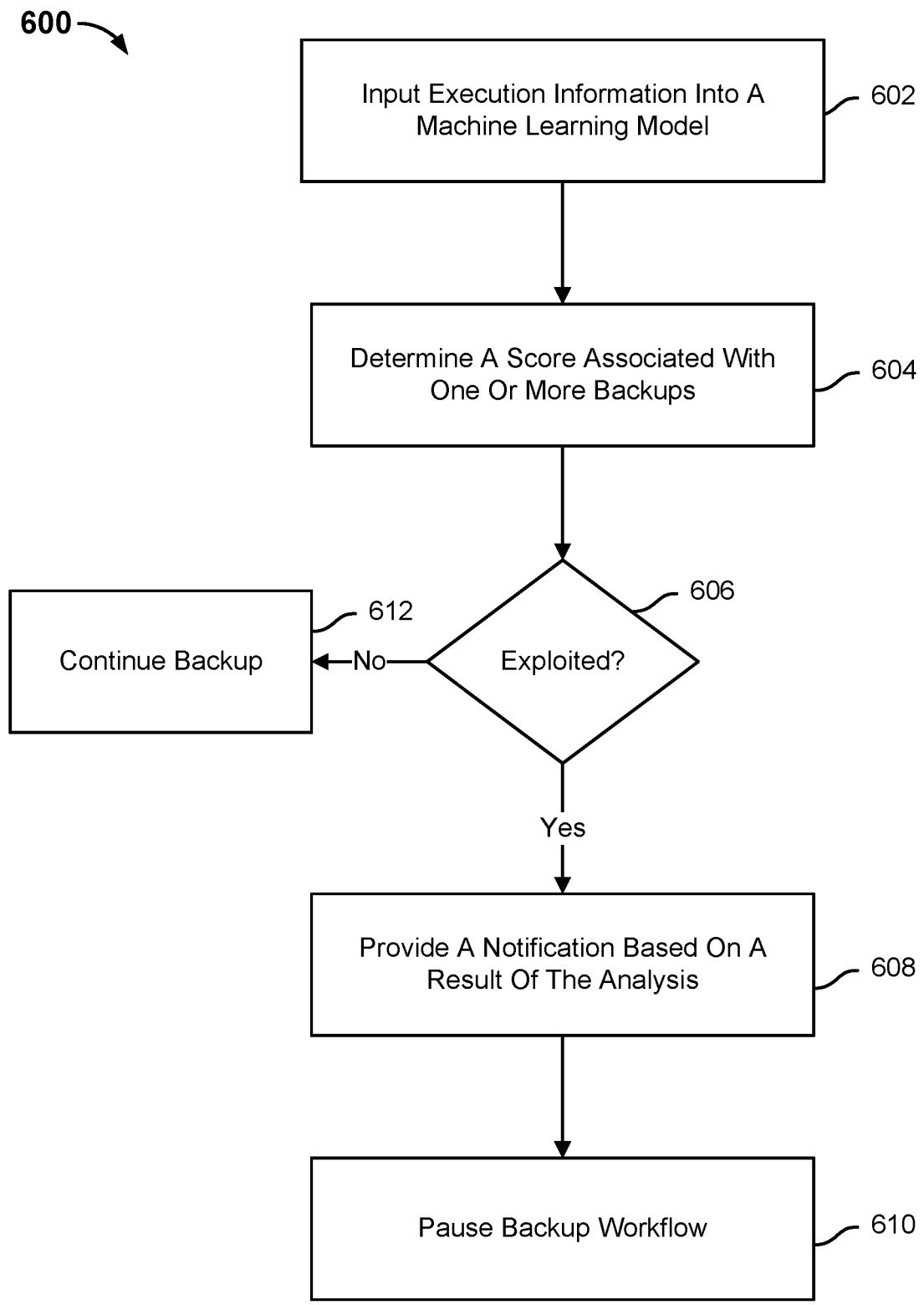
FIG. 6 is a flow diagram illustrating a process of analyzing current execution information in accordance with some embodiments.

FIG. 6 is a flow diagram illustrating a process of analyzing current execution information in accordance with some embodiments. In the example shown, process 600 may be implemented by a storage system, such as storage system 112. In some embodiments, process 600 is implemented to perform some or all of step 506 of process 500.

At 602, execution information is inputted into a machine learning model. In some embodiments, the execution information is associated with a current backup. In some embodiments, the execution information is associated with a current backup and one or more previous backups.

The machine learning model may be trained using a supervised machine learning algorithm. For example, the supervised machine learning algorithm may be a linear regression algorithm, a logistical regression algorithm, a random forest algorithm, a gradient boosted trees algorithm, a support vector machines algorithm, a neural networks algorithm, a decision tree algorithm, a Naïve Bayes algorithm, a nearest neighbor algorithm, or any other type of supervised machine learning algorithm. In some embodiments, the machine learning model is trained using a semi-supervised machine learning algorithm that utilizes one or more labeled data sets and one or more pseudo-labeled data sets. In some embodiments, the machine learning model is trained using a reinforcement machine learning algorithm. For example, the reinforcement machine learning algorithm may be a Q-Learning algorithm, a temporal difference algorithm, a Monte-Carlo tree search algorithm, an asynchronous actor-critic agent's algorithm, or any other type of reinforcement machine learning algorithm. In some embodiments, the machine learning model is trained using an unsupervised machine learning algorithm. For example, clustering methods, anomaly detection, neural network, etc.

At 604, a score associated with one or more backups is determined. In some embodiments, the machine learning model outputs the score based on the execution information associated with a current backup. In some embodiments, the machine learning model outputs the score based on the execution information associated with a current backup and one or more previous backups.

At 606, it is determined whether the score associated with the backup indicates the source system has been exploited. The score associated with the backup is compared to an exploitation threshold score. In response to a determination that the score indicates the source system has been exploited (e.g., the score associated with the backup is greater than the exploitation threshold score), process 600 proceeds to 608. In response to a determination that the score does not indicate that the source system has been exploited (e.g., the score associated with the backup is not greater than the exploitation threshold score), process 600 proceeds to 612.

In some embodiments, the score indicates the source system has been exploited in the event the score associated with the backup is greater than the exploitation threshold score and the score indicates the source system has not been exploited in the event the score associated with the backup is not greater than the exploitation threshold score.

At 608, a notification based on a result of the analysis is provided. The notification may be provided to a user associated with the source system via a graphical user interface associated with the source system. In some embodiments, the notification is provided to an external system. In some embodiments, the notification is provided to the storage system.

At 610, the backup workflow is altered based on a policy. In some embodiments, the policy indicates that the backup is flagged as being suspicious. In some embodiments, the policy indicates that a storage destination for the backup is to be modified from a storage system to a sandbox environment. In some embodiments, the policy indicates that backup is to be paused. In some embodiments, the policy indicates the backup is to be stored at a remediation system instead of the storage system.

In some embodiments, step 610 is optional.

At 612, a backup workflow is continued.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
receiving an indication to perform a first backup of data stored in a persistent storage associated with a source system, wherein the source system is running one or more objects and the data comprises object data associated with the one or more objects;
based on the indication to perform the first backup, capturing first current execution information associated with the source system, wherein the first current execution information is indicative of a first execution state of the source system;
causing the captured first current execution information to be stored with first backup data from the first backup of the data stored in the persistent storage;
capturing second current execution information associated with the source system, wherein the second current execution information is indicative of a second execution state of the source system, and wherein the first current execution information and the second current execution information each includes one or more of computer process tables, a list of one or more current running computer processes, a list of one or more scheduled computer processes, or a log of one or more recently executed computer processes;
analyzing the captured first current execution information and the captured second current execution information to determine one or more indications of an exploitation associated with the source system; and
based on the one or more indications of an exploitation associated with the source system, modifying a backup workflow.

2. The method of claim 1, wherein the first current execution information and the second current execution information each further includes one or more of one or more connections and their corresponding status or network status information.

3. The method of claim 1, wherein the first current execution information is obtained from a computer process table stored in a volatile memory of the source system.

4. The method of claim 1, wherein the first current execution information is captured at one or more points in time associated with the first backup of data stored in the persistent storage associated with the source system.

5. The method of claim 4, wherein the one or more points in time associated with the first backup of data stored in the persistent storage associated with the source system include a point in time after the indication has been received.

6. The method of claim 4, wherein the one or more points in time associated with the first backup of data stored in the persistent storage associated with the source system include a point in time after initiation of the first backup of data stored in the persistent storage associated with the source system.

7. The method of claim 6, wherein the one or more points in time associated with the first backup of data stored in the persistent storage associated with the source system include one or more additional points in time after initiation of the first backup of data stored in the persistent storage associated with the source system.

8. The method of claim 4, wherein the one or more points in time associated with the first backup of data stored in the persistent storage associated with the source system include a point in time after completion of the first backup of data stored in the persistent storage associated with the source system.

9. The method of claim 1, further comprising initiating the first backup of the data stored in the persistent storage associated with the source system.

10. The method of claim 1, wherein the second current execution information is associated with at least one of a subsequent full backup or one or more subsequent incremental backups.

11. The method of claim 1, wherein analyzing the captured first current execution information and the captured second current execution information to determine the one or more indications of the exploitation associated with the source system includes inputting the captured second current execution information to a machine learning model.

12. The method of claim 11, wherein analyzing the captured first current execution information and the captured second current execution information to determine the one or more indications of the exploitation associated with the source system includes comparing a score outputted by the machine learning model to an exploitation threshold score.

13. The method of claim 12, wherein analyzing the captured first current execution information and the captured second current execution information to determine the one or more indications of the exploitation associated with the source system includes providing a notification based on a determination that the score outputted by the machine learning model indicates that the source system has been exploited.

14. The method of claim 12, wherein analyzing the captured first current execution information and the captured second current execution information to determine the one or more indications of the exploitation associated with the source system includes canceling one or more scheduled processes based on a determination that the score outputted by the machine learning model indicates that the source system has been exploited.

15. The method of claim 12, wherein analyzing the captured first current execution information and the captured second current execution information to determine the one or more indications of the exploitation associated with the source system includes altering a backup workflow for a second backup of data stored in the persistent storage associated with the source system based on a determination that the score outputted by the machine learning model indicates that the source system has been exploited.

16. Non-transitory computer-readable media comprising computer instructions that, when executed by one or more processors, cause the one or more processors to:
receive an indication to perform a first backup of data stored in a persistent storage associated with a source system, wherein the source system is configured to run one or more objects and the data comprises object data associated with the one or more objects;
based on the indication to perform the first backup, capture first current execution information associated with the source system, wherein the first current execution information is indicative of a first execution state of the source system;

cause the captured first current execution information to be stored with first backup data from the first backup of the data stored in the persistent storage;

capture second current execution information associated with the source system, wherein the second current execution information is indicative of a second execution state of the source system, and wherein the first current execution information and the second current execution information each includes one or more of computer process tables, a list of one or more current running computer processes, a list of one or more scheduled computer processes, or a log of one or more recently executed computer processes;

analyze the captured first current execution information and the captured second current execution information to determine one or more indications of an exploitation associated with the source system; and based on the one or more indications of an exploitation associated with the source system, modify a backup workflow.

17. The non-transitory computer-readable media of claim 16, wherein the first current execution information and the second current execution information each includes one or more of one or more connections and their corresponding status or network status information.

18. The non-transitory computer-readable media of claim 16, wherein the first current execution information is obtained from a computer process table stored in a volatile memory of the source system.

19. The non-transitory computer-readable media of claim 16, wherein the first current execution information is captured at one or more points in time associated with the first backup of data stored in the persistent storage associated with the source system.

20. A system, comprising:
memory storing instructions; and
a processor configured to execute the instructions to:
receive an indication to perform a first backup of data stored in a persistent storage associated with a source system, wherein the source system is configured to run one or more objects and the data comprises object data associated with the one or more objects;

based on the indication to perform the first backup, capture first current execution information associated with the source system, wherein the first current execution information is indicative of a first execution state of the source system;

cause the captured first current execution information to be stored with first backup data from the first backup of the data stored in the persistent storage;

capture second current execution information associated with the source system, wherein the second current execution information is indicative of a second execution state of the source system, and wherein the first current execution information and the second current execution information each includes one or more of computer process tables, a list of one or more current running computer processes, a list of one or more scheduled computer processes, or a log of one or more recently executed computer processes;

analyze the captured first current execution information and the captured second current execution information to determine one or more indications of an exploitation associated with the source system; and based on the one or more indications of an exploitation associated with the source system, modify a backup workflow.

* * * * *